United States Patent Office

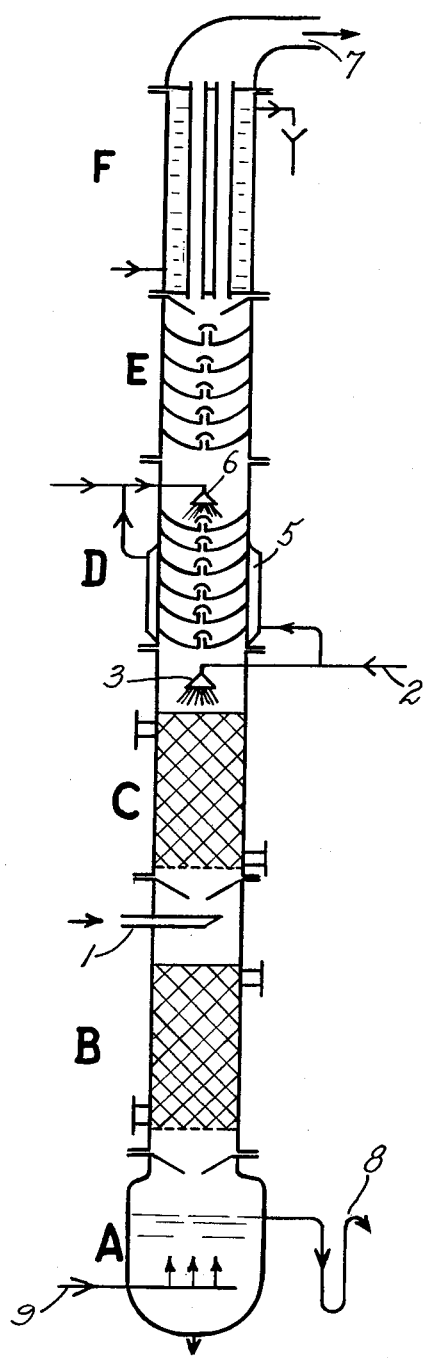

2,756,841
Patented July 31, 1956

---

2,756,841

PROCESS FOR THE SEPARATION OF HYDROCYANIC ACID FROM AMMONIA IN GAS MIXTURES CONTAINING THE SAME

Erich Asendorf, Bad Homburg, Germany, assignor to Deutsche Gold- und Silber-Scheideanstalt vormals Roessler, Frankfurt am Main, Germany, a corporation of the German Republic Application March 13, 1952, Serial No. 276,368

Claims priority, application Germany March 16, 1951

6 Claims. (Cl. 183—115)

The present invention relates to an improved process for separating hydrocyanic acid from ammonia in gaseous mixtures containing the same.

Mixtures of ammonia and hydrocyanic acid are often present in many technical gas mixtures such as for example the crude synthesis gases obtained in the direct synthesis of hydrocyanic acid from ammonia and carbon monoxide and illuminating gas which can contain these gases in addition to other gases such as carbon dioxide and hydrogen sulfide. The recovery of these gases as such, or for the sake of safety from such technical gases which usually also contain inert gases, is often desired. Previously the separation of ammonia, hydrogen sulfide, carbon dioxide and hydrocyanic acid from each other or from the accompanying inert gases was usually accomplished chemically in salt forming reactions. For example, it is customary in the purification of illuminating gas to separate the ammonia from the inert and acidic gases with the aid of a sulfuric acid wash. This type of purification, whether it be a dry or wet purification, requires the use of considerable quantities of chemicals and leads to the recovery of at least a portion of the components to be separated in a less valuable bound form.

It is an object of the present invention to provide a simple and economical method for the separation of ammonia from hydrocyanic acid in gas mixtures containing the same without the aid of costly chemicals.

In accordance with the invention, it has been unexpectedly discovered that ammonia can be effectively separated from hydrocyanic acid by subjecting vapor mixtures of these substances to a countercurrent scrubbing with water at temperatures between 60 and 95° C. The process according to the invention, therefore, only requires the use of water and steam instead of the chemicals previously required. In gas mixtures which contain other water soluble gases, such as for example carbon dioxide and hydrogen sulfide in addition to ammonia, hydrocyanic acid and inert gases, it is expedient first to wash out the ammonia, hydrocyanic acid, carbon dioxide and hydrogen sulfide from the gas mixture to be purified by a water wash and then to drive out the gases absorbed by the wash water over a column after such wash water has been heated in a heat exchanger. Thereafter the resulting vapor mixture is subjected, according to the invention, in a column to countercurrent scrubbing with water at temperatures between 60 and 95° C., whereby the hydrocyanic leaves the head of the column together with any carbon dioxide and hydrogen sulfide and the ammonia is collected in the form of a weak ammonia solution in the sump of the column. The ammonia can be recovered from the resulting weak solution by conventional means. The recovery of hydrocyanic acid from the gas leaving the head of the column can also be achieved by conventional means. Advantageously, the main quantity of the hydrocyanic acid is first recovered from the gas leaving the head of the column which also can contain carbon dioxide and/or hydrogen sulfide, by cooling and liquifying the hydrocyanic acid.

It was not to be expected that the differences in the partial pressures of hydrocyanic acid and ammonia in the respective boiling points of the hydrocyanic acid-water and ammonia-water systems in the range of 60 to 95° C. would suffice to effect a practical far reaching separation of ammonia from hydrocyanic acid by the countercurrent scrubbing according to the invention. It has also been ascertained that a noticeable polymerization of the hydrocyanic acid only occurs when the residual hydrocyanic acid is not removed when the scrubbing column is brought to a standstill. Even in such an instance, the polymerization only begins about an hour after the operation of the column has been shut down.

The accompanying drawing diagrammatically shows, by way of example, a scrubbing apparatus which has been found well suited for a substantially quantitative separation of ammonia from hydrocyanic acid.

The apparatus disclosed in the drawings is a column composed of five sections, A through F. A is a sump in which the dilute ammonia water containing the ammonia separated collects. Above this four column sections, B through E, are arranged, of which sections B and C have their lower portions filled with filling bodies and sections D and E are provided with bell-shaped bubble plates. Section F is a dephlegmator.

In operation, the vapor mixture containing ammonia and hydrocyanic acid is introduced into the upper part of section B above the filling material contained therein through conduit 1 and heated water is introduced into the upper portions of sections C and D from conduit 2 through sprayers 3 and 6. Preferably the water introduced into section D is not as warm as that introduced into section C and preferably a portion of the water from conduit 2 is branched off to heat exchanger 5 where it gives up a portion of its heat to the lower portion of section D before it is introduced therein through sprayer 6. The gases leaving column E are cooled in the dephlegmator F, for example, to about 26 to 30° C., to condense water vapors contained therein and establish the required reflux conditions. The weak ammonia solution which collects in sump A is preferably heated directly with steam which is introduced through conduit 9, and the weak ammonia solution is withdrawn through conduit 8. If desired, the ammonia can be separated therefrom under vacuum and the resulting water can be used as the scrubbing water fed to conduit 2. The hydrocyanic acid containing vapors leave the top of the apparatus through outlet 7.

The quantity of steam and water supplied to the column depends upon the pressure existing at the foot of the column and the solubility of ammonia in water at the temperature and pressure employed. Also the quantity of wash water employed depends to some extent upon the quantity of ammonia introduced and is selected so as to give as concentrated an ammonia solution as possible at the foot of the column.

The following examples illustrate several preferred modifications of the process according to the invention.

*Example I*

A column 200 mm. in height and 30 mm. diameter filled with Raschig rings was arranged over a sump and a sufficient quantity of vapors which contained water vapor in addition to ammonia and hydrocyanic acid were introduced at 100° C. into the column above the sump so that about 10 liters of each of the ammonia and hydrocyanic acid vapors were introduced per hour. The column was sprayed with wash water at 90° C. The ammonia was recovered as a 2% solution in the wash water which ran off. The hydrocyanic acid leaving the head of the column was passed through a dephlegmator maintained at 30° C.

Example 2

350 cubic meters per hour of a gas mixture containing 2.4% of hydrocyanic acid, 2.4% of ammonia and 2.4% of carbon dioxide were washed per hour with 1000 liters water to remove all of the ammonia and hydrocyanic acid and about one half of the carbon dioxide. The resulting wash water was preheated to 95° C. and then treated with steam to drive out all of the ammonia, hydrocyanic acid and carbon dioxide contained therein. The resulting vapors were introduced into the midsection of a fractionating column 7000 mm. high and 600 mm. in diameter. 700 liters of wash water were introduced at 75–85° C. per hour into the upper third of the column. The ammonia containing wash water which collected in the sump was heated to 90° C. with direct steam to assist in driving off any hydrocyanic acid contained in such wash water. The ammonia containing wash water which collected in the sump contained 99.5% of the ammonia introduced into the column and was contaminated with 2% of the hydrocyanic acid and small quantities of the carbon dioxide introduced. The vapors leaving the head of the column contain 98% of the hydrocyanic acid and 0.5% of the ammonia introduced into the column.

Example 3

A gas mixture containing 6.2 vol. per cent of hydrocyanic acid, 5.9 vol. per cent of ammonia and 7.3 vol. per cent of carbon dioxide in addition to inert water insoluble gases were scrubbed with water to remove all of the hydrocyanic acid and ammonia and a little less than half of the carbon dioxide. These gases were recovered from the wash water as described in Example 2 and the resulting vapors were supplied to the upper part of section B of the apparatus shown in the accompanying drawing at a temperature of 95° C. The quantity supplied per hour was 25 kg. of HCN, 14.8 kg. of $NH_3$ and 23 kg. of $CO_2$. 335 liters per hour of water at 83° C. were introduced into the upper portion of section C through sprayer 3 and 50 liters per hour of water at 60° C. were introduced into the upper portion of section D. Steam was supplied to the ammonia solution collecting in sump A at a gauge pressure of 0.1 atmosphere to remove the last traces of HCN contained therein. The gases leaving the top of section E were cooled to 26° to 30° C. while passing through dephlegmator F to insure proper reflux conditions. 610 liters per hour of 2.43% ammonia water were withdrawn from sump A through conduit 8; the quantity of ammonia contained therein was 14.8 kg. indicating quantitative recovery of the ammonia introduced in the gas mixture. The gases leaving the head of the apparatus at 7 contained 63.9 volumes of pure HCN and 36.1 volumes of $CO_2$ discounting small quantities of air. Upon cooling such gases to −10° C., 54.9 volumes of HCN corresponding to 21.5 kg. per hour were recovered. The remaining HCN in the gas mixture was separated from the $CO_2$ by scrubbing with water.

Example 4

100 kg. per hour of an aqueous solution containing 14.75 kg. of ammonium cyanide and 10.85 kg. of ammonium carbonate were rapidly evaporated to provide a vapor mixture composed of 76.9 kg. $H_2O$, 9.3 kg. $NH_3$ and 9.0 kg. of HCN. This vapor mixture was introduced into section B of the apparatus shown in the accompanying drawing and 100 liters per hour of water at 70° C. were introduced into section C and 30 liters per hour of water at 55° C. were introduced into section D. 20 kg. of steam per hour were introduced at 1000 mm./Hg into sump A through line 9. 256.9 kg. of water per hour containing 9.3 kg. of $NH_3$ and a trace of formic acid were withdrawn from sump A. The ammonia was recovered from the aqueous solution by degasification under vacuum. The gases leaving the apparatus at 7 were treated to recover pure HCN as in Example 3.

Similarly, $NH_3$ and HCN were recovered from an ammonium cyanide and carbonate solution which also contained ammonium sulfide by increasing the temperature of the wash water supplied to sections C and D, respectively, to 95° C. and 70° C. The dephlegmator F was operated under stronger reflux condition to compensate for the increase in temperature. The recovery of HCN from the gas mixture leaving the apparatus at 7 which contained $H_2S$ in addition to $CO_2$ was effected in the same manner as the separation from $CO_2$ as described in Example 3.

I claim:

1. A process for separating ammonia from hydrocyanic acid contained in gas mixtures which comprises scrubbing a stream of a vapor mixture containing ammonia and hydrocyanic acid countercurrently with water at temperatures between 60 and 95° C., collecting the resulting aqueous ammonia solution and separately collecting the resulting purified hydrocyanic acid containing gas.

2. A process for separating ammonia from hydrocyanic acid contained in gas mixtures, which comprises passing a vapor mixture containing ammonia and hydrocyanic acid upwardly through a fractionating column, countercurrently scrubbing the vapors passing upwardly through the column with water at temperatures between 60 and 95° C., removing the resulting aqueous ammonia solution from the bottom of the column and removing the purified hydrocyanic acid containing gas from the head of the column.

3. A process for separating ammonia from hydrocyanic acid contained in gas mixtures, which comprises introducing a vapor mixture containing ammonia and hydrocyanic acid into a fractionating column above the bottom thereof, introducing water at a temperature between 60 and 95° C. into the fractionating column above the point at which the vapor mixture is introduced to scrub said vapors with said water at such temperatures, introducing water at a lower temperature into the column at a point above that where said first mentioned water is introduced to wash the scrubbed vapors, removing the resulting aqueous ammonia solution which collects at the bottom of the column and removing the purified hydrocyanic acid containing gas from the head of the column.

4. A process in accordance with claim 3 which comprises in addition introducing steam into the aqueous ammonia solution which collects at the bottom of the column.

5. A process for removing ammonia from a gas mixture containing ammonia, hydrocyanic acid and at least one other water soluble gas in admixture with water insoluble inert gases which comprises scrubbing the gas mixture with water to remove all of the ammonia and hydrocyanic acid and at least a portion of the other water soluble gas, heating the resultant aqueous solution to drive off all of such absorbed gases, scrubbing a stream of the resulting vapor mixture countercurrently with water at temperatures between 60° and 95° C., collecting the resulting aqueous ammonia solution and separately collecting the resulting purified hydrocyanic acid containing gas.

6. A process according to claim 5 in which said other water soluble gas is at least one of the gases, carbon dioxide and hydrogen sulfide.

References Cited in the file of this patent

UNITED STATES PATENTS

| | | |
|---|---|---|
| 1,471,926 | Schafer | Oct. 23, 1923 |
| 1,932,525 | Jacobson et al. | Oct. 31, 1933 |

(Other references on following page)

UNITED STATES PATENTS

| | | |
|---|---|---|
| 2,143,821 | Sperr | Jan. 10, 1939 |
| 2,185,989 | Roberts, Jr. | Jan. 2, 1940 |
| 2,393,229 | Bouchard | Jan. 22, 1946 |
| 2,516,507 | Deming | July 25, 1950 |
| 2,540,905 | Neubauer et al. | Feb. 6, 1951 |

FOREIGN PATENTS

| | | |
|---|---|---|
| 498,796 | Great Britain | Jan. 13, 1939 |

OTHER REFERENCES

Mellor: "Comprehensive Treatise on Inorganic and Theoretical Chemistry," vol. 3, page 194.

Hasche, abstract of application Ser. No. 633,843, published February 7, 1950, 631 O. G. 283.

"American Gas Practice" by Morgan, 2d edition, published by Jerome J. Moran, Maplewood, N. J., 1931, page 139.

"Handbook of Chemistry and Physics," by Chemical Rubber Publishing Co., 31st edition, pages 449 and 397.